United States Patent
Lee

(10) Patent No.: US 12,407,009 B2
(45) Date of Patent: Sep. 2, 2025

(54) METHOD AND DEVICE FOR CONTROLLING DETERIORATION AVOIDANCE OPERATION OF FUEL CELL SYSTEM

(71) Applicants: Hyundai Motor Company, Seoul (KR); Kia Corporation, Seoul (KR)

(72) Inventor: Hyun Seung Lee, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 648 days.

(21) Appl. No.: 17/873,710

(22) Filed: Jul. 26, 2022

(65) Prior Publication Data

US 2023/0125311 A1    Apr. 27, 2023

(30) Foreign Application Priority Data

Oct. 27, 2021  (KR) .................. 10-2021-0144455

(51) Int. Cl.
*H01M 8/04*       (2016.01)
*H01M 8/0267*     (2016.01)
(Continued)

(52) U.S. Cl.
CPC ..... *H01M 8/04753* (2013.01); *H01M 8/0267* (2013.01); *H01M 8/04029* (2013.01);
(Continued)

(58) Field of Classification Search
CPC ......... H01M 8/04753; H01M 8/04302; H01M 8/0267; H01M 8/04029; H01M 8/04097;
(Continued)

(56) References Cited

U.S. PATENT DOCUMENTS

2001/0053950 A1* 12/2001 Hasegawa ............... B60L 58/30
                                                         701/22
2009/0140066 A1    6/2009 Han
(Continued)

FOREIGN PATENT DOCUMENTS

JP              4593311 B2    12/2010
JP           2016-035865 A     3/2016
(Continued)

*Primary Examiner* — James M Erwin
(74) *Attorney, Agent, or Firm* — Fox Rothschild LLP

(57) ABSTRACT

Disclosed is a method and a device configured to control deterioration avoidance operation of a fuel cell system. In one aspect, the method may include starting the deterioration avoidance operation when an operation of a fuel cell is restarted in a state where an energy storage device is operating, and the fuel cell is stopped; controlling anode hydrogen pressure based on a predetermined condition, the condition indicating that the anode hydrogen pressure needs to be increased; determining hydrogen recirculation and supplying hydrogen including a process to determine whether to recirculate hydrogen based on a predetermined condition, the condition indicating that hydrogen needs to be recirculated, before supplying hydrogen; determining air recirculation and supplying air including a process to determine whether to recirculate air based on a predetermined condition, the condition indicating that air needs to be recirculated, before supplying air; and terminating the deterioration avoidance operation and starting operation of the fuel cell.

14 Claims, 8 Drawing Sheets

(51) Int. Cl.
*H01M 8/04029* (2016.01)
*H01M 8/04089* (2016.01)
*H01M 8/04302* (2016.01)
*H01M 8/0432* (2016.01)
*H01M 8/0438* (2016.01)
*H01M 8/04537* (2016.01)
*H01M 8/04664* (2016.01)
*H01M 8/04746* (2016.01)

(52) U.S. Cl.
CPC ... *H01M 8/04097* (2013.01); *H01M 8/04302* (2016.02); *H01M 8/0432* (2013.01); *H01M 8/04388* (2013.01); *H01M 8/04552* (2013.01); *H01M 8/04582* (2013.01); *H01M 8/04671* (2013.01); *H01M 2250/20* (2013.01)

(58) Field of Classification Search
CPC ........... H01M 8/0432; H01M 8/04388; H01M 8/04552; H01M 8/04582; H01M 8/04671; H01M 2250/20

USPC ........................................................ 429/400
See application file for complete search history.

(56) References Cited

U.S. PATENT DOCUMENTS

| | | | |
|---|---|---|---|
| 2010/0009219 A1* | 1/2010 | Kwon | H01M 8/04567 429/432 |
| 2010/0021778 A1* | 1/2010 | Steinshnider | H01M 8/04164 429/410 |
| 2012/0214077 A1* | 8/2012 | Garrettson | H01M 8/04228 429/429 |
| 2013/0196240 A1* | 8/2013 | Furusawa | H01M 8/04097 429/429 |

FOREIGN PATENT DOCUMENTS

| KR | 10-2014-0029791 A | 3/2014 |
|---|---|---|
| KR | 10-2021-0062192 A | 5/2021 |

* cited by examiner

METHOD AND DEVICE FOR CONTROLLING DETERIORATION AVOIDANCE OPERATION OF FUEL CELL SYSTEM

CROSS-REFERENCE TO RELATED APPLICATION

This application is based on and claims the benefit of Korean Patent Application No. 10-2021-0144455, filed on Oct. 27, 2021, in the Korean Intellectual Property Office, the disclosure of which is incorporated herein by reference.

TECHNICAL FIELD

Embodiments of the present disclosure relate to a method and a device for controlling deterioration avoidance operation of a fuel cell system, and more particularly to a method and a device for controlling deterioration avoidance operation of a fuel cell system configured to detect whether mixed potential or reverse current is generated inside a fuel cell stack during an actual operation, and when determined that mixed potential or reverse current is generated, the type of generated mixed potential or reverse current is diagnosed so as to selectively apply a strategy of preventing deterioration, the strategy suitable for a corresponding situation, based on the real-time diagnosis result.

DESCRIPTION OF THE RELATED ART

A fuel cell is an electrochemical device that uses an electrochemical reaction between hydrogen and oxygen so as to generate electrical energy or electric power. Particularly, in a proton-exchange membrane fuel cell (PEMFC) system widely applied to vehicles, water acts as a medium to transfer hydrogen ions (H+) to an electrode membrane between a cathode and an anode. For this reason, maintaining water content of the electrolyte membrane greater than or equal to a predetermined level is directly related to the performance of the fuel cell.

For example, in the case of a dry condition in which water is insufficient, moisture content of the electrolyte membrane is reduced, resulting in an increase in the resistance of the electrode and degrading the performance of the fuel cell. Whereas, in the case of a flooding condition having too much moisture, water is condensed in a channel, through which air and hydrogen are supplied, at the cathode and the anode, thereby blocking supply of reactant gas to the electrode, which causes an abrupt drop in fuel cell voltage. When the fuel cell is continuously operated under the aforementioned dry condition or flooding condition, deterioration of the fuel cell is accelerated.

In the proton-exchange membrane fuel cell (PEMFC), a polymer electrolyte membrane transfers hydrogen ions, acts as a barrier that prevents hydrogen and oxygen from meeting each other, and acts as an electrical insulator between two electrodes, which are the anode and the cathode. Here, since the polymer electrolyte membrane does not perfectly act as a barrier, gas permeates the polymer electrolyte membrane, and the amount of permeated gas affects the performance and durability of the PEMFC. When the amount of permeated gas increases, open-circuit voltage (OCV) decreases, and the fuel efficiency decreases due to the amount of fuel consumed without participating in the electrochemical reaction. Hydrogen permeated through the polymer membrane at the anode meets oxygen at the cathode, and becomes $H_2O$, $H_2O_2$, $HO_2$, etc. by the action of platinum catalysis or is discharged without reacting. As these reactions proceed, a mixed potential is formed along with an oxygen reduction reaction, which is an original reaction of the cathode, thereby reducing the OCV.

When hydrogen permeated through the membrane meets oxygen, $H_2O_2$ or oxygen radicals are generated by the action of the platinum catalyst. The hydrogen peroxide or radicals attack the polymer of the electrolyte membrane, deteriorate the membrane, and create a pinhole, and the gas permeability increases due to the generated pinhole. As a result, the rate of generation of hydrogen peroxide and radicals becomes faster, and the membrane deteriorates rapidly.

In this regard, a method of using a relay resistance-connected cathode oxygen depletion (COD) heater is applied as a method of rapidly increasing stack temperature so as to solve a problem of freezing inside a stack during cold start in a fuel cell vehicle. In this example, the COD heater may be operated during shutdown so as to remove residual oxygen in the cathode, and hydrogen and cooling water may be simultaneously heated during the cold start. In addition, during cold start, heated hydrogen is supplied to prevent generation of condensed water in the stack.

Meanwhile, in the case of a fuel cell system to which the COD heater method is applied, excessive generation of condensed water in the stack during cold start may be prevented. However, the COD heater method may only prevent deterioration of the stack by removing residual oxygen from the cathode. Therefore, in various operating conditions of actual vehicles and systems other than the cold start condition, it is difficult to prevent deterioration of the cell due to generation of local reverse current or mixed potential caused by excessive air inflow to the anode and excessive hydrogen inflow to the cathode.

Particularly, reverse current is generated due to the formation of an interface between hydrogen and air at an air inlet-side anode, which may cause local deterioration of the fuel cell. Regarding the local degradation of the cell due to the generation of the reverse current in the cell, in a state in which hydrogen and oxygen coexist in the cathode, a high-potential cathode is not caused even if reverse current is generated, so corrosion of carbon is insignificant. On the other hand, in a state in which hydrogen and oxygen coexist in the anode, a high-potential cathode is caused when reverse current is generated, thereby causing corrosion of carbon and increasing the risk of local cell deterioration.

Patent Document 1 (KR 10-2014-0029791 A), Patent Document 2 (US 2009-0140066 A1), etc. disclose techniques to prevent deterioration of a stack by preventing excessive generation of condensed water in the stack during cold start of the fuel cell stack and removing residual oxygen from the cathode.

However, in various operating conditions of actual vehicles and systems other than the cold start condition, the techniques disclosed in Patent Document 1 and Patent Document 2 are not capable of preventing cell deterioration due to generation of local reverse current or mixed potential caused by excessive air inflow to the anode and excessive hydrogen inflow to the cathode.

The information disclosed in this Background of the Invention section is only for enhancement of understanding of the general background of the invention, and should not be taken as an acknowledgement or any form of suggestion that this information forms the related art already known to a person skilled in the art.

SUMMARY

Therefore, in certain aspects, embodiments of the present disclosure has been made in view of the above problems, and it is an object of embodiments of the present disclosure to diagnose a risk of generation of mixed potential and reverse current in the fuel cell and diagnose whether deterioration of a stack is caused by the risk during operation of a fuel cell so as to perform an operation to avoid deterioration based on the diagnosis result, thereby effectively preventing deterioration of the fuel cell In another aspect, embodiments of the present disclosure to provide a method of controlling deterioration avoidance operation of a fuel cell system which presents an optimal avoidance strategy in consideration of the surrounding conditions of the fuel cell and the system when performing the operation to avoid deterioration due to the generation of mixed potential and reverse current in the fuel cell to thereby increase operation stability and durability of the fuel cell system.

In further aspects, embodiments of the present disclosure to provide a method of controlling deterioration avoidance operation which is capable of preventing the risk of deterioration that may occur when the operation of the fuel cell is temporarily stopped, such as in an electric vehicle (EV) mode powered only by batteries, as well as when the stack of the fuel cell system is restarted.

In accordance with an embodiment of the present disclosure, a method and a device for controlling deterioration avoidance operation of a fuel cell system are provided, the method including starting the deterioration avoidance operation when an operation of the fuel cell is restarted in a state where an energy storage device is operating, and the fuel cell is stopped, controlling hydrogen pressure at an anode based on a predetermined condition, the condition indicating that the hydrogen pressure at the anode needs to be increased, determining hydrogen recirculation and supplying hydrogen comprising a process performed such that whether to recirculate hydrogen is determined based on a predetermined condition, the condition indicating that hydrogen needs to be recirculated, before supplying hydrogen, determining air recirculation and supplying air comprising a process performed such that whether to recirculate air is determined based on a predetermined condition, the condition indicating that air needs to be recirculated, before supplying air, and terminating the deterioration avoidance operation and starting an operation of the fuel cell.

In certain aspects, the step of starting the deterioration avoidance operation may include controlling cooling water setting performed such that a temperature of cooling water in the fuel cell is variably controlled based on a deterioration rate of the fuel cell and outside temperature.

In certain aspects, the step of controlling cooling water setting may be performed such that, in a case where the deterioration rate of the fuel cell is lower than a standard level and the outside temperature is at or above a reference temperature, the temperature of the cooling water is controlled so that a target temperature of the fuel cell is maintained lower than a first reference temperature only when an open circuit voltage (OCV) is lower than a first set voltage, and in a case where the deterioration rate of the fuel cell is greater than or equal to the standard level and the outside temperature is lower than the reference temperature, the temperature of the cooling water is controlled to be increased by a heater so that the target temperature of the fuel cell is greater than or equal to a second reference temperature only when the open circuit voltage (OCV) is lower than the first set voltage.

In certain aspects, the step of controlling hydrogen pressure may be performed such that whether to increase hydrogen pressure at the anode is diagnosed based on open circuit decay time (ODT), and the hydrogen pressure at the anode is increased to exceed a predetermined anode reference pressure based on the diagnosis result so as to selectively control the anode pressure to be maintained greater than the cathode pressure.

In certain aspects, a step of determining hydrogen recirculation and supplying hydrogen may be performed such that whether to recirculate hydrogen is diagnosed based on the open circuit voltage (OCV) and the deviation of current distribution inside the fuel cell so as to selectively recirculate hydrogen based on the diagnosis result, and then pure hydrogen is supplied.

In certain aspects, a step of determining air recirculation and supplying air may be performed such that whether to recirculate the air is diagnosed based on the open circuit voltage (OCV) deviation between cells while the fuel cell operation is stopped so as to selectively recirculate the air based on the diagnosis result, and then air is supplied.

In accordance with another embodiment of the present disclosure, there is provided a method of controlling deterioration avoidance operation of a fuel cell system, the method including starting the deterioration avoidance operation when the fuel cell is restarted after the fuel cell system is turned off, controlling hydrogen pressure at an anode based on a predetermined condition, the condition indicating that the hydrogen pressure at the anode needs to be increased, determining hydrogen recirculation and supplying hydrogen including a process performed such that whether to recirculate hydrogen is determined based on a predetermined condition, the condition indicating that hydrogen needs to be recirculated, before supplying hydrogen, recirculating air and supplying air performed such that air is recirculated, and then air is supplied to a cathode, and terminating the deterioration avoidance operation and starting an operation of the fuel cell.

In certain aspects, the step of starting the deterioration avoidance operation may be performed such that, in a case where the deterioration rate of the fuel cell is lower than a standard level and the outside temperature is at or above a reference temperature, cooling water is recirculated based on the outside temperature, and in a case where the deterioration rate of the fuel cell is greater than or equal to the standard level and the outside temperature is lower than the reference temperature, the temperature of the cooling water is controlled to be increased by a heater so that the target temperature of the fuel cell is greater than or equal to a second reference temperature.

In certain aspects, a step of controlling hydrogen pressure may be performed such that whether to increase the hydrogen pressure at the anode is diagnosed based on open circuit decay time (ODT), and the hydrogen pressure at the anode is increased to exceed a predetermined anode reference pressure based on the diagnosis result so as to selectively control the anode pressure to be maintained greater than the cathode pressure.

In certain aspects, a step of determining hydrogen recirculation and supplying hydrogen may be performed such that whether to recirculate hydrogen is diagnosed based on the open circuit voltage (OCV) and the deviation of current distribution inside the fuel cell so as to selectively recirculate hydrogen based on the diagnosis result, and then pure hydrogen is supplied.

In certain aspects, a step of starting the deterioration avoidance operation may be performed such that when the fuel cell starts operating after being stopped for more than a preset reference time, whether the deterioration avoidance operation is possible is checked before starting the deterioration avoidance operation, and when any one among the detected amount of hydrogen outside the fuel cell, increase in open circuit decay time (ODT), and increase rate of cooling water ion conductivity compared to previous measurements exceeds a preset criteria for a corresponding one thereof, or when a minimum value of ODT for each cell is less than a minimum decay time while the fuel cell operation is stopped, it is determined that the deterioration avoidance operation is impossible, and the fuel cell is switched to a state in which starting of the fuel cell is impossible.

In accordance with a further embodiment of the present disclosure, there is provided an operation control device configured to avoid deterioration of a fuel cell when the fuel cell is restarted after being stopped, the device including a state information collector configured to collect state information of the fuel cell system including a voltage, a current, and an ODT of the fuel cell, a cooling water controller configured to control a temperature and circulation of the cooling water, a hydrogen pressure controller configured to selectively increase anode hydrogen pressure depending on an anode hydrogen pressure increase condition, the condition being determined based on the ODT information provided from the state information collector, a hydrogen recirculation controller configured to selectively perform hydrogen recirculation before supplying hydrogen depending on the hydrogen recirculation condition determined based on the open circuit voltage information and the deviation of current distribution inside the fuel cell provided from the state information collector, and an air recirculation controller configured to selectively perform air recirculation before supplying air depending on the air recirculation condition determined based on the open circuit voltage information or stoppage condition before restart provided from the state information collector.

The state information collector may be configured to further collect degradation degree and outside temperature of the fuel cell, and the cooling water controller may be configured such that (i) when restarting the fuel cell after temporarily stopping the operation of the fuel cell while an energy storage device is operating, in a case where the deterioration rate of the fuel cell is lower than a standard level and the outside temperature is at or above a reference temperature, the temperature of the cooling water is controlled so that a target temperature of the fuel cell is maintained lower than a first reference temperature only when an open circuit voltage (OCV) is lower than a first set voltage, and in a case where the deterioration rate of the fuel cell is greater than or equal to the standard level and the outside temperature is lower than the reference temperature, the temperature of the cooling water is controlled to be increased by a heater so that the target temperature of the fuel cell is greater than or equal to a second reference temperature only when the open circuit voltage (OCV) is lower than the first set voltage, and (ii) when the fuel cell is restarted after the fuel cell system is turned off, in a case where the deterioration rate of the fuel cell is lower than a standard level and the outside temperature is at or above a reference temperature, cooling water is recirculated based on the outside temperature, and in a case where the deterioration rate of the fuel cell is greater than or equal to the standard level and the outside temperature is lower than the reference temperature, the temperature of the cooling water is controlled to be increased by a heater so that the target temperature of the fuel cell is greater than or equal to a second reference temperature.

The air recirculation controller may be configured such that (i) when an operation of the fuel cell is restarted in a state where the energy storage device is operating and the fuel cell is stopped, air recirculation is performed before supplying air only when the deviation of the open circuit voltage (OCV) between cells exceeds a preset reference value during operation of the fuel cell, and (ii) when the fuel cell is restarted after the fuel cell system is turned off, air recirculation is obligatorily performed before supplying air.

As discussed, the method and system suitably include use of a controller or processer.

In another aspect, vehicles are provided that comprise an apparatus as disclosed herein.

BRIEF DESCRIPTION OF THE DRAWINGS

The above and other objects, features, and other advantages of embodiments of the present disclosure will be more clearly understood from the following detailed description taken in conjunction with the accompanying drawings, in which.

DETAILED DESCRIPTION OF THE PREFERRED EMBODIMENTS

Figure 1:
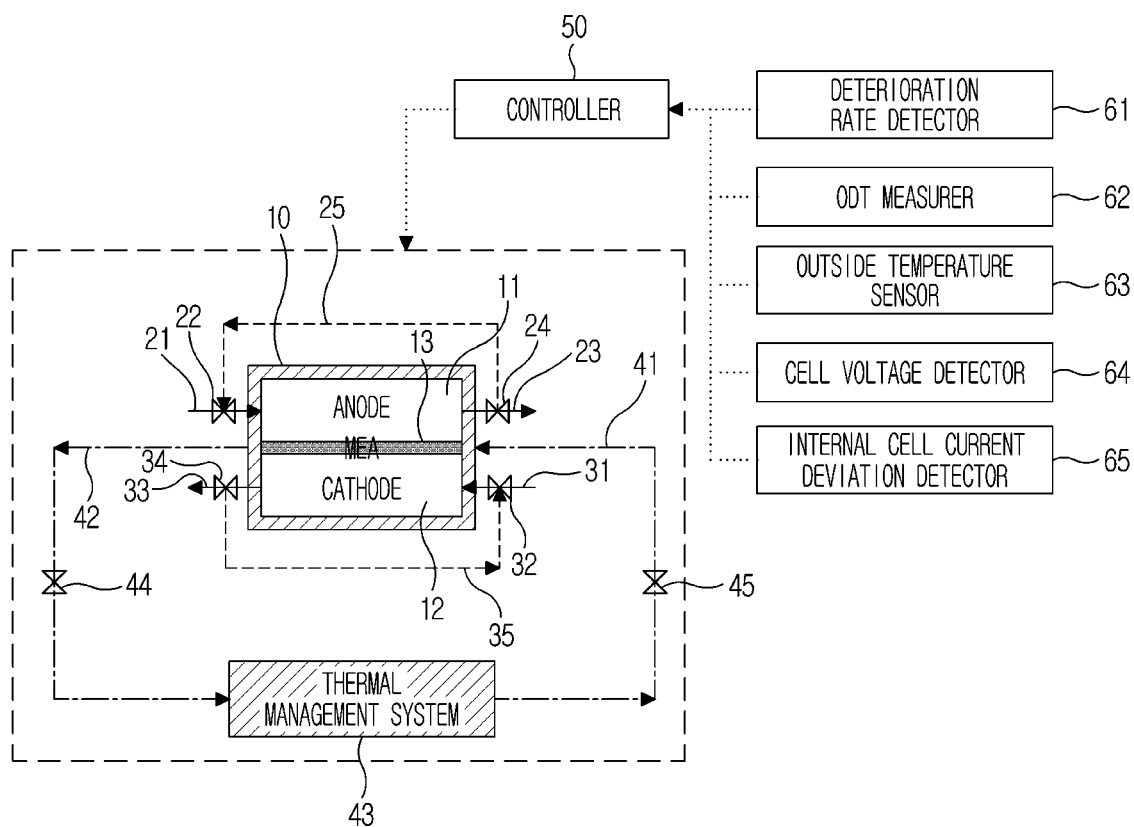
FIG. 1 is a block diagram schematically illustrating the configuration of a fuel cell system including a device for controlling deterioration avoidance operation according to an exemplary embodiment of the present disclosure.

Reference will now be made in detail to the preferred embodiments of the present disclosure, examples of which are illustrated in the accompanying drawings. Wherever possible, the same reference numbers will be used throughout the drawings to refer to the same or like parts.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence, or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller, or the like. Examples of computer readable media include, but are not limited to, ROM, RAM, compact disc (CD)-ROMs, magnetic tapes, floppy disks, flash drives, smart cards, and optical data storage devices. The computer readable medium can also be distributed in network coupled computer systems so that the computer readable media is stored and executed in a distributed fashion, e.g., by a telematics server or a Controller Area Network (CAN).

Embodiments of the present disclosure relate to a method and a device for controlling deterioration avoidance operation of a fuel cell system configured to diagnose the risk of occurrence of mixed potential and reverse current in the fuel cell and possible stack degradation during fuel cell operation, and perform an operation to avoid degradation, thereby effectively preventing fuel cell degradation.

To this end, embodiments of the present disclosure provide a method of controlling an avoidance operation capable of being applied uniformly to classified conditions, the classified conditions being derived by combining restart condition, current fuel cell condition, external environmental condition, etc. so as to select and classify dangerous conditions that may lead to generation of mixed potential and reverse current in the fuel cell during restart. Particularly, embodiments of the present disclosure provide an operation control device and method for effectively avoiding deterioration even under various operation conditions of the fuel cell by presenting diagnostic criteria for each classified deterioration risk condition, and by suggesting a series of avoidance operation control methods capable of solving the deterioration risk step by step based on the diagnosis result.

Hereinafter, a method and a device configured to control deterioration avoidance operation of a fuel cell system according to various embodiments of the present disclosure will be described in detail with reference to the accompanying drawings.

FIG. 1 is a block diagram schematically illustrating the configuration of a fuel cell system including a device for controlling deterioration avoidance operation according to an exemplary embodiment of the present disclosure.

Particularly, in FIG. 1, among the entire configurations of the fuel cell system, only the configurations needed in explaining the deterioration avoidance operation control device of the fuel cell system according to embodiments of the present disclosure will be limitedly described, and descriptions of other configurations inside the fuel cell system that are not directly related to embodiments of the present disclosure will be omitted.

As shown in FIG. 1, the fuel cell system includes a fuel cell for power generation. Such a fuel cell includes cells constructed such that an anode, a cathode, and a membrane electrode assembly (MEA) are stacked. Such a fuel cell may be implemented as a single cell. However, the fuel cell is generally manufactured as a fuel cell stack in which a plurality of cells is stacked to increase the amount of power generation. In describing an exemplary embodiment of the present disclosure, the fuel cell may be a fuel cell stack in which a plurality of cells is stacked. However, the fuel cell or fuel cell stack in embodiments of the present disclosure is not limited to the stacked type and may include other embodiments.

In a typical fuel cell stack, an air supply system configured to supply air is connected to a cathode (air electrode), and a hydrogen supply system configured to supply hydrogen is connected to an anode (fuel electrode). The air supply system may include an air compressor that sucks in external air and compresses and delivers the air to a humidifier, and the humidifier that humidifies the compressed air to have an appropriate humidity level. In addition, an air shutoff valve may be installed to block the supply of air. Regarding the hydrogen supply system, a hydrogen supply line may be provided with a hydrogen shutoff valve configured to control supplying and blocking of hydrogen stored in a hydrogen tank, and an ejector configured to supply hydrogen that has passed through the valve to the anode side. At the front end and the rear end of the ejector, a hydrogen pressure sensor configured to detect pressure may be installed.

As shown in FIG. 1, an anode 11 of a fuel cell 10 may be provided with a hydrogen supply line 21 configured to supply hydrogen towards a hydrogen inlet side, and a hydrogen shutoff valve 22 may be installed on the hydrogen supply line 21. Regarding a hydrogen outlet at the rear end of the anode 11, there may be formed a hydrogen discharge line 23 configured to discharge hydrogen that has passed through the anode, and a hydrogen discharge valve 24 may be installed on the hydrogen discharge line 23. In addition, a hydrogen recirculation line 25 may be formed between the hydrogen inlet and the hydrogen outlet of the anode 11, and hydrogen not participating in the reaction may be returned to the anode 11 side through the hydrogen recirculation line 25.

At an air inlet side of the cathode 12, an air supply line 31 and an air shutoff valve 32 may be installed. An air discharge line 33 and an air discharge valve 34 may be installed at an air outlet side of the rear end of the cathode 12, and air supply to the cathode 12 side may be controlled by controlling corresponding valves. In addition, an air recirculation line 35 may be formed between the air inlet and the air outlet of the cathode 12, and by controlling an opening degree of an air recirculation valve, a portion of the air at the cathode outlet may be recirculated upstream of the humidifier to thereby increase the total air flow rate. In this regard, the valve for air recirculation may be a separate valve or may be integrated into the air shutoff valve as in FIG. 1, for example, a three-way valve.

In addition, a cooling water channel configured to supply cooling water may be installed in the fuel cell, and there may be included a thermal management system 43 configured to control the temperature of cooling water passing through the cooling water channel. FIG. 1 schematically shows such a cooling system. In the cooling system, cooling water may be supplied towards the fuel cell side through a cooling water supply line 41, may pass through the inside of the fuel cell, is returned through a cooling water return line 42, and then may pass through the thermal management system 43. In addition, valves 44 and 45 configured to control the circulation of cooling water may be installed in the cooling system, and the flow rate of the cooling water may be controlled by controlling the opening degree of the valves 44 and 45.

In such a cooling system, a cooling water temperature sensor configured to measure the temperature of cooling water may be installed, and preferably, the cooling water temperature sensor may be installed to measure the temperature of cooling water at the outlet side of the fuel cell stack. The temperature of cooling water may be controlled to follow the target temperature of the fuel cell stack, and a heater may be provided to rapidly increase the temperature of cooling water when needed (e.g., during cold start).

A controller 50 in FIG. 1 may be a fuel cell controller, which is a high-level controller configured to comprehensively collect various state information on the fuel cell so as to control all configurations of the fuel cell based on the collected information. Alternatively, the controller may refer to a controller in narrow sense, which is configured to control avoidance operation according to embodiments of the present disclosure. Accordingly, the controller 50 in embodiments of the present disclosure may be configured to control avoidance operation of the fuel cell by collecting state information on the inside of the fuel cell system and controlling configurations inside the fuel cell system based on the collected state information.

FIG. 1 shows an example of the above description. Referring to FIG. 1, the controller 50 may be configured to collect state information provided from a deterioration rate detector 61, which detects a deterioration rate inside the fuel cell system, an ODT measurer 62, an outside air temperature sensor 63, a cell voltage detector 64, an internal cell current deviation detector 65, which detects current deviation inside the cell, and to control the fuel cell system based on the collected information.

The deterioration rate detector 61 may be configured to detect the deterioration rate of the fuel cell, and more specifically, the deterioration rate detector 61 may be configured to calculate the deterioration rate based on the ratio of the maximum voltage of the fuel cell stack to the actual output voltage thereof.

The ODT measurer 62 may be configured to measure open circuit decay time (ODT), which indicates the time taken for the cell voltage to decrease from a reference voltage (e.g., IV) to a threshold voltage (e.g., 0.75V) in a state in which the air supplied to the fuel cell stack is cut off. The ODT may be used as a means to estimate degradation of stack performance due to deterioration of the fuel cell.

The outside air temperature sensor 63 may be configured to measure the temperature of air outside the fuel cell system and is provided to check the starting environment of the fuel cell by measuring the temperature outside the system.

The cell voltage detector 64 may be configured to measure a cell voltage in the fuel cell stack. The cell voltage detector 64 may be configured to measure each cell voltage using voltage measurement channels for each cell in the stack. Meanwhile, the cell voltage detector 64 in the embodiments of present disclosure may be configured to calculate an average stack voltage or to calculate additional information such as a stack voltage deviation in addition to measuring the voltage for each cell.

The internal cell current deviation detector 65 may be configured to detect a current deviation for each region based on the internal cell current distribution. Here, the region inside the cell is divided into a plurality of regions, and the internal cell current deviation detector 65 may detect a difference in current distribution for each divided region and a current deviation resulting therefrom.

For example, as shown in Table 1 below, the region inside the cell is divided into 64 regions, and cell current is measured for each divided region to thereby detect a cell current distribution and a cell current deviation.

TABLE 1

| R1, C1 | R2, C1 | R3, C1 | R4, C1 | R5, C1 | R6, C1 | R7, C1 | R8, C1 | R9, C1 | R10, C1 | R11, C1 | R12, C1 | R13, C1 | R14, C1 | R15, C1 | R16, C1 |
|---|---|---|---|---|---|---|---|---|---|---|---|---|---|---|---|
| R1, C2 | R2, C2 | R3, C2 | R4, C2 | R5, C2 | R6, C2 | R7, C2 | R8, C2 | R9, C2 | R10, C2 | R11, C2 | R12, C2 | R13, C2 | R14, C2 | R15, C2 | R16, C2 |
| R1, C3 | R2, C3 | R3, C3 | R4, C3 | R5, C3 | R6, C3 | R7, C3 | R8, C3 | R9, C3 | R10, C3 | R11, C3 | R12, C3 | R13, C3 | R14, C3 | R15, C3 | R16, C3 |
| R1, C4 | R2, C4 | R3, C4 | R4, C4 | R5, C4 | R6, C4 | R7, C4 | R8, C4 | R9, C4 | R10, C4 | R11, C4 | R12, C4 | R13, C4 | R14, C4 | R15, C4 | R16, C4 |

In the above table, (R1, C1) may be a hydrogen inlet side, and (R16, C4) may be a hydrogen outlet side. (R16, C1) may be an air inlet side, and (R1, C4) may be an air outlet side.

The internal cell current deviation detector 65 may detect current deviation for each region of the cell, such as a left region of the cell, a central region of the cell, and a right region of the cell.

Meanwhile, based on the current distribution inside the fuel cell upon start or stoppage of the fuel cell, it may be seen that reverse current is generated in some regions due to the formation of an interface between hydrogen and air at the anode side.

Regarding the fact that reverse current is generated in the cell due to mixing of gas at each of the electrodes to cause deterioration, when hydrogen and oxygen coexist in the cathode, the high-potential cathode is not caused even when reverse current is generated, so corrosion of carbon is minimal, and the electrode of the cathode is locally deteriorated. On the other hand, in a state in which hydrogen and oxygen coexist in the anode, a high-potential cathode is caused when reverse current is generated, thereby causing corrosion of carbon and increasing the risk of stack deterioration.

The risk of deterioration due to generation of reverse current and mixed potential in the fuel cell stack is caused by mixing of gas at each electrode. For this reason, as a strategy for preventing the risk of deterioration, embodiments of the present disclosure provide an operation control method of avoiding deterioration due to the formation of reverse current and mixed potential. In this regard, FIG. 2 shows the main configuration of a deterioration avoidance operation control device of a fuel cell system according to an exemplary embodiment of the present disclosure.

Figure 2:
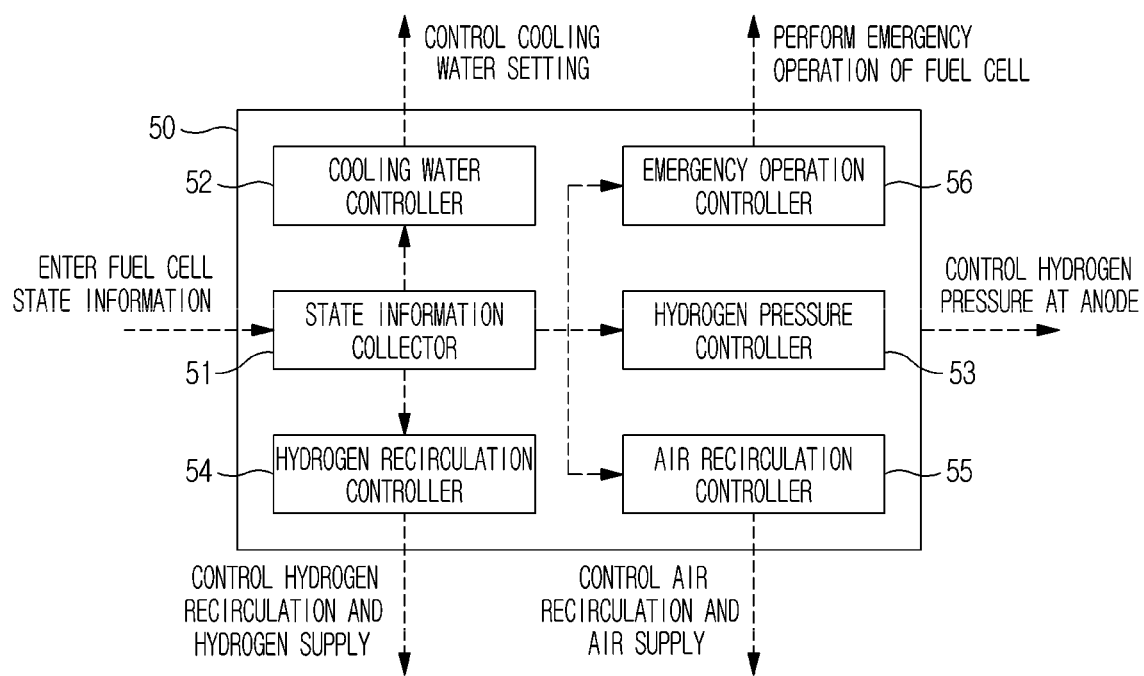
FIG. 2 is a block diagram illustrating the main configuration of the device for controlling deterioration avoidance operation of the fuel cell system according to an exemplary embodiment of the present disclosure.

The controller 50 shown in FIG. 2 may be an example of the operation control device configured to avoid deterioration of the fuel cell system according to embodiments of the present disclosure and may refer to an operation control device configured to avoid deterioration of the fuel cell when the fuel cell is restarted after being stopped.

As shown in FIG. 2, the controller 50 may include a state information collector 51 configured to collect state information of the fuel cell system, a cooling water controller 52 configured to control the operation and setting of cooling water, a hydrogen pressure controller 53 configured to selectively control the pressure of hydrogen, a hydrogen recirculation controller 54 configured to determine whether to recirculate hydrogen and perform recirculation control, and an air recirculation controller 55 configured to determine whether to recirculate air and perform recirculation control. In addition, the controller 50 may further include an emergency operation controller 56 configured to diagnose the deterioration state of the fuel cell stack so as to control the fuel cell system in an emergency operation mode when it is determined that the avoidance operation cannot be performed.

In implementing the control logic set in each of the cooling water controller 52, the hydrogen pressure controller 53, the hydrogen recirculation controller 54, and the air recirculation controller 55 in FIG. 2, each of the configurations may diagnose the risk of deterioration as a specific condition is achieved, and selectively perform control based on the diagnosis result. Here, each of the configurations may be a processor configured to operate based on predetermined control logic. In addition, although not shown in FIG. 2, such control logic may be stored in a memory in a form referable by each of the configurations. In the memory, state information of the fuel cell, which is to be referenced in the diagnosis process performed by each of the configurations, such as ODT during previous operation, ion conductivity of cooling water in the stack, etc. may be stored. Such diagnosis and control logic may be appropriately updated depending on change in state in the fuel cell. For example, the diagnosis and control logic may be updated by variably setting reference values for each diagnosis based on the degree of deterioration. For this reason, the reference values described herein are merely an example, and the embodiment of the present disclosure is not limited to the reference values.

The state information collector 51 may be a configuration to collect information on internal and external states of the fuel cell system, which is the information including the voltage, current, ODT, degradation degree, and outside temperature of the fuel cell. The information collected by the state information collector 51 may be used to diagnose deterioration risk and derive an optimal avoidance operation control method for each state and is not limited to the examples described above.

The cooling water controller 52 may be configured to control the temperature and circulation of the cooling water. The cooling water controller 52 in embodiments of the present disclosure may be provided to maintain the internal temperature of the stack within an appropriate temperature range depending on whether it is necessary to block bidirectional crossover inside the cell (bidirectional crossover between the anode and the cathode). The purpose of controlling the temperature of the cooling water is to suppress the generation of reverse current in the entire cell space. For example, whether the reverse current is generated may be determined based on a predetermined level in which an open circuit voltage (OCV) is less than a first reference voltage (e.g., 0.85V). In this case, control over the upper voltage limit may be released, and setting of the cooling water may vary depending on the condition of the stack and the outside air temperature.

The cooling water controller 52 may perform the avoidance operation control differently depending on the state of the restart condition (for example, in the case of restarting the fuel cell after temporarily stopping the operation of the fuel cell while the battery is operating in the vehicle fuel cell system or restarting the fuel cell in the off state after the vehicle is stopped), the fuel cell deterioration rate, and the outside air temperature.

For example, (i) when the fuel cell is restarted while the energy storage device is operating and the fuel cell is stopped, the cooling water controller 52 may perform control differently depending on the degradation rate of the fuel cell and the outside air temperature in the following two ways.

In a case where the deterioration rate of the fuel cell is lower than a standard level and the outside temperature is at or above a reference temperature, the temperature of the cooling water may be controlled so that a target temperature of the fuel cell is maintained lower than a first reference temperature (e.g., 45° C.) only when an open circuit voltage (OCV) is lower than a first set voltage. Accordingly, membrane hydration and bidirectional crossover may be reduced.

On the other hand, in a case where the deterioration rate of the fuel cell is greater than or equal to the standard level and the outside temperature is lower than the reference temperature, the temperature of the cooling water may be controlled to be increased by a heater so that the target temperature of the fuel cell is greater than or equal to a second reference temperature only when the open circuit voltage (OCV) is lower than the first set voltage. Accordingly, a high-temperature and low-humidity state may be maintained, and membrane hydration may be reduced.

(ii) When the fuel cell is restarted after the fuel cell system is turned off, in a case where the deterioration rate of the fuel cell is lower than a standard level and the outside temperature is at or above a reference temperature, cooling water may be recirculated based on the outside temperature.

On the other hand, in a case where the deterioration rate of the fuel cell is greater than or equal to the standard level and the outside temperature is lower than the reference temperature, the temperature of the cooling water may be controlled to be increased by a heater so that the target temperature of the fuel cell is greater than or equal to a second reference temperature.

The hydrogen pressure controller 53 may be configured to selectively increase the anode hydrogen pressure based on an anode hydrogen pressure increase condition determined based on the ODT information provided from the state information collector 51. The hydrogen pressure controller 53 may be configured to increase the anode pressure based on a predetermined anode hydrogen pressure increase condition so as to prevent reverse current on the right side of the cell in the cell current distribution diagram described above, and to allow reverse current on the left side of the cell. Here, the anode pressure may be controlled to allow hydrogen crossover and block air crossover. Accordingly, in order to prevent the risk of generating a reverse current, the anode pressure may be controlled to be higher than the cathode pressure when a predetermined condition is satisfied. To this end, a reference pressure (e.g., 130 kPa) to increase the anode pressure may be set, and the hydrogen pressure controller 53 may control the hydrogen supply system so that the anode pressure is equal to or greater than the reference pressure. In addition, when the shortest ODT in the cell is less than the reference time (e.g., 50 seconds) while the stack is stopped, this may be set as a condition to increase anode hydrogen pressure. The reference time may be set based on a value at which the internal pressure of the cathode is less than atmospheric pressure.

Depending on the hydrogen recirculation condition determined based on the open circuit voltage information and the deviation of current distribution within the fuel cell provided from the state information collector 51, the hydrogen recirculation controller 54 may selectively perform hydrogen recirculation before supplying hydrogen. The hydrogen recirculation controller 54 may be configured to prevent increase in current distribution deviation inside the cell (left side of the cell>>right side of the cell) so as to prevent reverse voltage due to a lean hydrogen condition. To this end, the hydrogen recirculation controller 54 may estimate the anode hydrogen concentration based on the open circuit voltage and the current distribution deviation inside the cell and determine whether to recirculate hydrogen based on the estimated anode hydrogen concentration. For example, the hydrogen recirculation controller 54 may check whether the open circuit voltage is less than a second set voltage (e.g., 0.8V) and whether the deviation of the current distribution inside the cell is greater than a reference value (e.g., 0.1 A) while the fuel cell is stopped so as to determine whether to recirculate hydrogen based on the result thereof. Therefore, when the hydrogen concentration is estimated to be less than a predetermined level, pure hydrogen may be supplied without recirculation, thereby securing a hydrogen concentration greater than or equal to the predetermined level. On the other hand, when the hydrogen concentration is greater than or equal to the predetermined level, hydrogen may be recirculated first, and then pure hydrogen may be supplied.

Depending on the air recirculation condition determined based on the open circuit voltage information or stoppage condition before restart provided from the state information collector 51, the air recirculation controller 55 may selectively perform air recirculation before supplying air. To this end, the air recirculation controller 55 may determine whether to recirculate the air based on the open circuit voltage (OCV) deviation between cells while the stack operation is stopped. The reason for selectively controlling the air recirculation is to alleviate the internal residual oxygen deviation between cells and to prevent performance deterioration deviation between cells from becoming severe. In the case of the air supply device of the cathode, when the internal pressure of the cathode drops below atmospheric pressure, air recirculation may be performed first, and then air may be supplied. On the other hand, when the internal pressure of the cathode is at a level similar to atmospheric pressure, air may be supplied without air recirculation control.

Due to the sequential control performed by such configurations inside the controller, namely, the cooling water controller 52, the hydrogen pressure controller 53, the hydrogen recirculation controller 54, and the air recirculation controller 55, it is possible to avoid mixed potential and reverse current inside the fuel cell stack. Such an avoidance operation may be implemented by a control logic reflecting the stack state condition and the external environmental condition.

Examples of a method for controlling deterioration avoidance operation of the fuel cell system for each situation will be described with reference to FIGS. 3 to 8.

Figure 3:
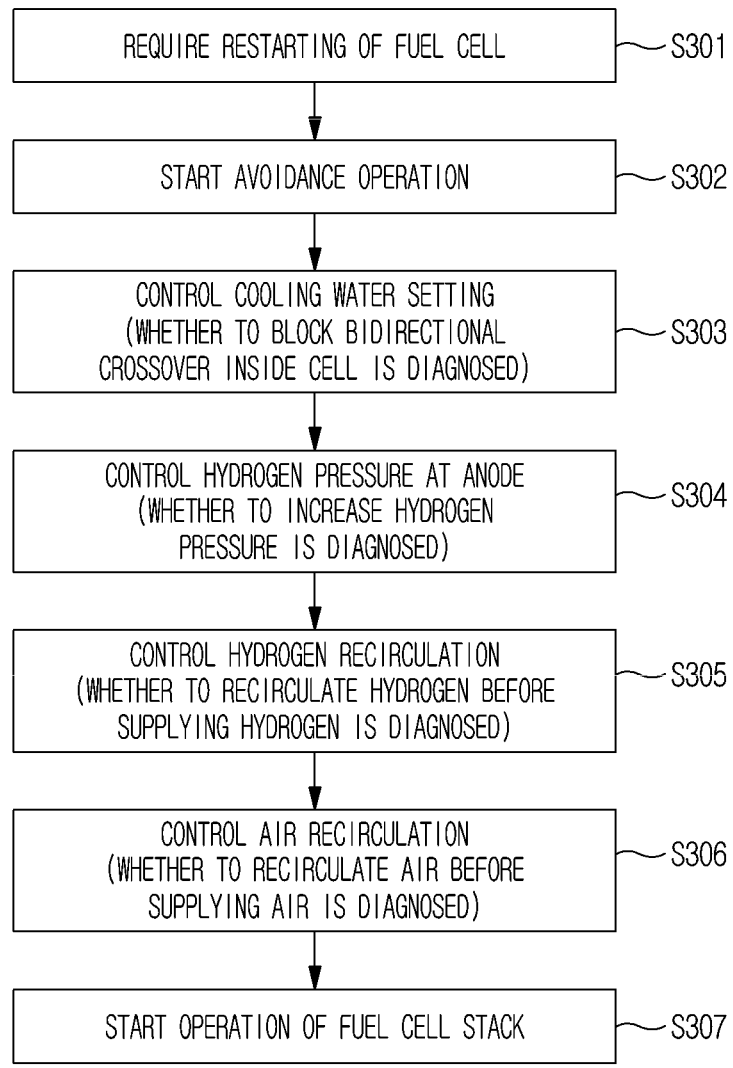
FIG. 3 is a flowchart illustrating steps performed in a method for controlling deterioration avoidance operation of the fuel cell system according to an exemplary embodiment of the present disclosure.

FIG. 3 is a flowchart illustrating steps performed in the method for controlling deterioration avoidance operation of the fuel cell system according to an exemplary embodiment of the present disclosure.

When the fuel cell is restarted after being stopped in step S301, an appropriate avoidance operation may be started based on the current state and environmental conditions of the fuel cell in step S302. In the step of starting the avoidance operation, an avoidance operation mode may be determined based on information such as a fuel cell restart condition (whether the system is paused while operating or restarted after system shutdown), fuel cell deterioration rate, and outside temperature. In addition, the step of starting the avoidance operation may include a step of controlling cooling water setting, which will be described later. In this case, the step of controlling cooling water setting may be performed depending on the avoidance operation mode determined based on the current condition.

The controlling cooling water setting may be performed in step S303 such that the cooling water controller diagnoses whether it is necessary to block bidirectional crossover inside the cell and controls the setting of the cooling water based on the diagnosis result.

Controlling hydrogen pressure at an anode may be performed in step S304 such that the hydrogen pressure controller diagnoses whether it is necessary to increase the hydrogen pressure to prevent reverse current on the right side of the cell, and selectively increase the hydrogen pressure based on the diagnosis result.

Afterwards, controlling hydrogen recirculation is performed in step S305 such that whether to recirculate hydrogen before supplying hydrogen is diagnosed so as to prevent increase in current distribution deviation inside the cell and to prevent reverse voltage due to a lean hydrogen condition, and hydrogen recirculation is selectively performed based on the diagnosis result, and then hydrogen is supplied.

Next, controlling air recirculation is performed in step S306 such that whether to recirculate air before supplying air is diagnosed so that air recirculation is selectively performed based on the diagnosis result, and then the air is supplied.

When the deterioration due to the formation of reverse current is diagnosed and controlling of avoidance operation is completed through the above-described steps, terminating the deterioration avoidance operation and starting an operation of the fuel cell stack may be performed in step S307.

Based on the basic steps, specific examples in which controlling of the deterioration avoidance operation of the fuel cell system is performed for each condition are described with reference to FIGS. 4 to 8.

Figure 4:
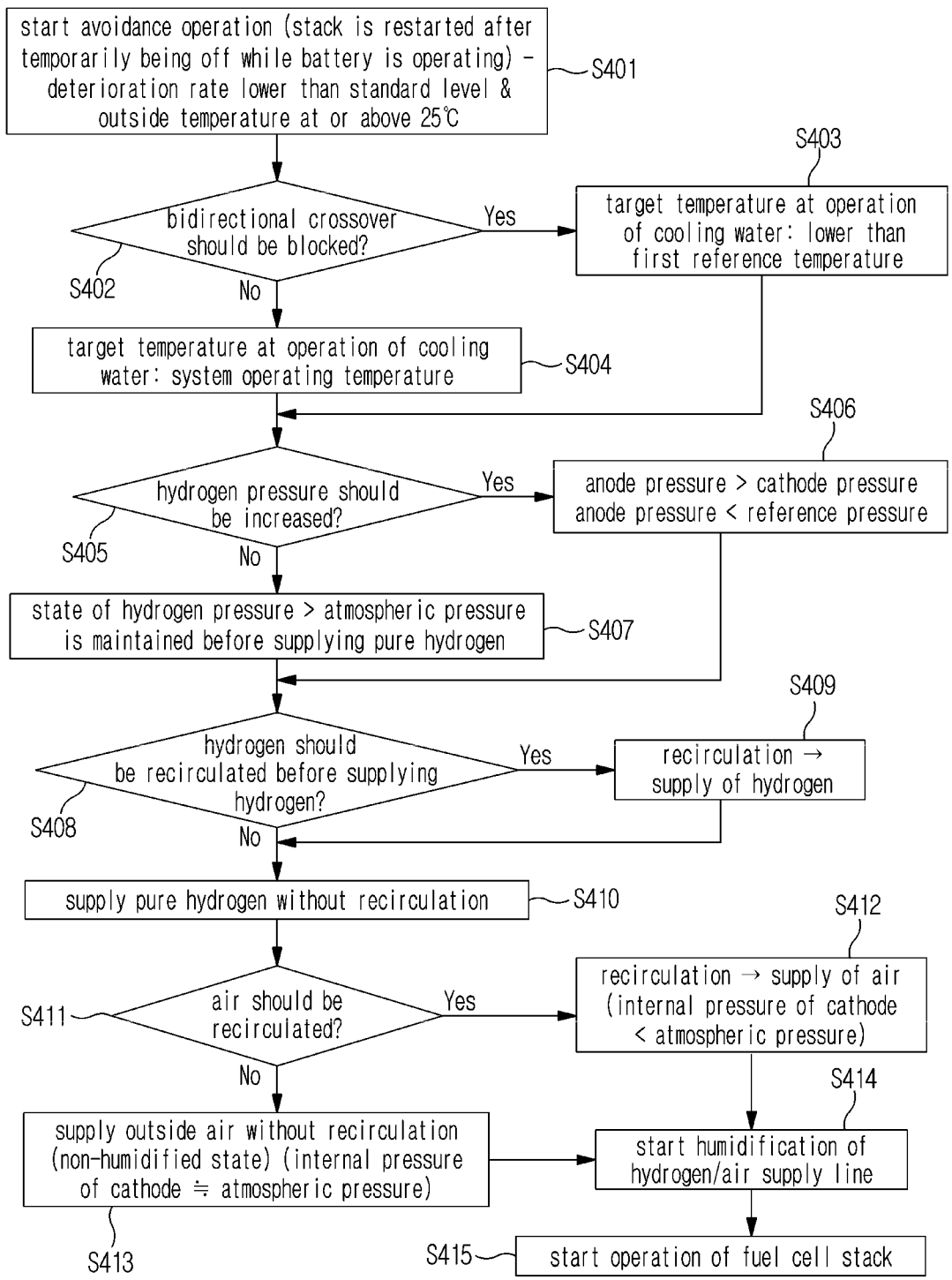
FIG. 4 is a flowchart illustrating a first embodiment of the method for controlling deterioration avoidance operation of the fuel cell system according to the present disclosure.
Figure 5:
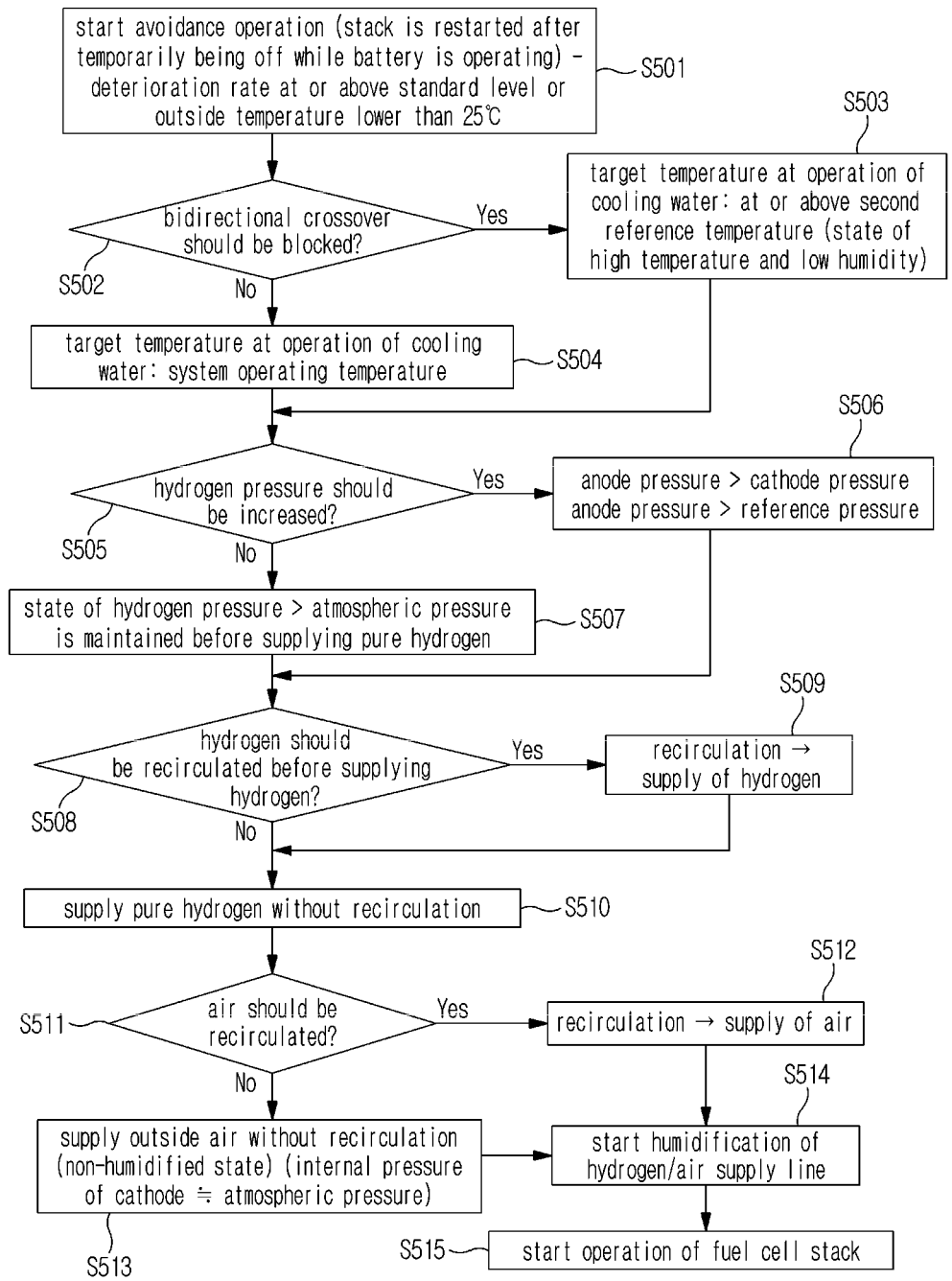
FIG. 5 is a flowchart illustrating a second embodiment of the method for controlling deterioration avoidance operation of the fuel cell system according to the present disclosure.

FIG. 4 is a flowchart illustrating a first embodiment of the method for controlling deterioration avoidance operation of the fuel cell system according to embodiments of the present disclosure, and FIG. 5 is a flowchart illustrating a second embodiment of the same. FIGS. 4 and 5 are for explaining an example in which, while an energy storage device (e.g., battery) is operating, the fuel cell is restarted in a state in which the stack is temporarily turned off. In particular, FIG. 4 relates to the first embodiment of the present disclosure, in which the deterioration rate of the fuel cell is lower than a standard level, which means that the stack output is good compared to the initial stack output, and the outside temperature is at or above room temperature (25° C.).

As shown in FIG. 4, starting the avoidance operation is performed in step S401 such that the current operation condition is checked and an avoidance operation suitable for the corresponding condition is started. Accordingly, in performing the step of starting the avoidance operation, control logic suitable for the corresponding operation condition and reference values for diagnosis may be determined.

When the avoidance operation is started, whether to block bidirectional crossover is diagnosed in step S402 so as to control setting of the cooling water.

Step S402 is performed so as to control the temperature and circulation of the cooling water. Step S402 is provided to maintain the internal temperature of the stack within an appropriate temperature range depending on whether it is necessary to block bidirectional crossover inside the cell (bidirectional crossover between the anode and the cathode). The purpose of controlling the temperature of the cooling water is to suppress the generation of reverse current in the entire cell space. For example, whether the reverse current is generated may be determined based on a predetermined level in which an open circuit voltage (OCV) is less than the first reference voltage (e.g., 0.85V, control over the upper voltage limit is released).

When it is determined that the bidirectional crossover should be blocked because the open circuit voltage is less than the first reference voltage, the temperature of the cooling water may be controlled so that the target temperature of the fuel cell is lower than the first reference temperature (e. 45° C.) in step S403. Accordingly, membrane hydration and bidirectional crossover may be reduced. Here, due to the circulation of the cooling water of the stack, the pressure of the anode and the pressure of the cathode may be maintained to be similar.

On the other hand, when it is determined that the blocking of the bidirectional crossover is unnecessary, the target temperature during operation of the cooling water may be set to be the system operating temperature without any change in step S404.

Next, after the blocking of the crossover (controlling of cooling water) is completed, whether to increase the hydrogen pressure at the anode is diagnosed in step S405. In this step, the anode pressure is increased based on a predetermined anode hydrogen pressure increase condition so as to prevent reverse current on the right side of the cell, and to allow reverse current on the left side of the cell. Here, the anode pressure is controlled to allow hydrogen crossover and block air crossover. Accordingly, in order to prevent the risk of generating a reverse current, the anode pressure may be controlled to be higher than the cathode pressure when a predetermined condition is satisfied. To this end, a reference pressure (e.g., 130 kPa) for increasing the anode pressure may be set, and the hydrogen pressure controller may control the hydrogen supply system so that the anode pressure is equal to or greater than the reference pressure. In addition, when the shortest ODT of the cell is less than the reference time (e.g., 50 seconds) while the stack is stopped, this may be set as a condition to increase anode hydrogen pressure. The reference time may be set based on a value at which the internal pressure of the cathode is less than atmospheric pressure.

Accordingly, when it is determined that the hydrogen pressure needs to be increased, the anode pressure is controlled to be greater than or equal to the cathode pressure, and the anode pressure is controlled to be greater than or equal to the reference pressure in step S406. On the other hand, upon determining that it is unnecessary to increase the hydrogen pressure, the hydrogen pressure is maintained at a level higher than the atmospheric pressure before supplying pure hydrogen in step S407.

Next, diagnosing whether to recirculate hydrogen before supplying hydrogen is performed in step S408. Based on the diagnosis performed in step S408, control to prevent reverse voltage due to a lean hydrogen condition is performed so as to prevent increase in current distribution deviation inside the cell (left side of the cell>>right side of the cell). To this end, the hydrogen recirculation controller 54 may estimate the anode hydrogen concentration based on the open circuit voltage and the current distribution deviation inside the cell and determine whether to recirculate hydrogen based on the estimated anode hydrogen concentration. For example, the hydrogen recirculation controller 54 may check whether the open circuit voltage is less than a second set voltage (e.g., 0.8V) and whether the deviation of the current distribution inside the cell is greater than a reference value (e.g., 0.1 A) while the fuel cell is stopped so as to determine whether to recirculate hydrogen based on the result thereof.

When it is diagnosed that recirculation of hydrogen needs to be performed because the hydrogen concentration is greater than or equal to a predetermined level, hydrogen recirculation is performed first, and then pure hydrogen is supplied in step S409.

On the other hand, when the hydrogen concentration is lower than the predetermined level, pure hydrogen is supplied immediately without recirculation, thereby securing a hydrogen concentration greater than or equal to the predetermined level in step S410.

When the recirculation and supply of hydrogen is completed, whether to recirculate air may be diagnosed in step S411. In this step, depending on the air recirculation condition determined based on the open circuit voltage (OCV) deviation between cells, air recirculation may be selectively performed before supplying air. Through this process, the variation in the internal residual oxygen between cells is alleviated and the variation in performance deterioration between cells may be prevented from becoming severe.

As shown in FIG. 4, when it is diagnosed that air recirculation is needed based on the state in which the internal pressure of the cathode has dropped below the atmospheric pressure, air recirculation is performed first, and then air is supplied in step S412. On the other hand, when the internal pressure of the cathode is at a level similar to atmospheric pressure, air is supplied (non-humidified state) without air recirculation control in step S413.

When the above avoidance operation processes are completed, humidification of the hydrogen supply line and the air supply line is started in step S414, and operation of the fuel cell stack is started in step S415.

Meanwhile, FIG. 5 relates to the second embodiment of the present disclosure, which is an example in which, while an energy storage device (e.g., battery) is operating, the fuel cell is restarted in a state in which the stack is temporarily turned off. In particular, the second embodiment relates to a state in which the deterioration rate of the fuel cell is higher than a standard level, which means that the stack output is bad compared to the initial stack output, and the outside temperature is lower than room temperature (25° C.), as in step S501). Therefore, the avoidance operation suitable for the above-described condition is started in step S401.

Deterioration of the stack proceeds rapidly under the above-described condition, and therefore, the adverse effect of flooding due to condensed water in the stack should be considered during low temperature operation. For this reason, it is necessary to quickly reach a state of high temperature and low humidity when controlling the initial cooling water. Therefore, a target temperature of the stack is set to a high temperature of 70-75° C. or higher so as to rapidly raise the temperature upon starting of the stack, thereby dehydrating the membrane at the high temperature and low humidity state, which is different from the first embodiment.

Therefore, when the avoidance operation is started, whether to block bidirectional crossover is checked so as to control setting of the cooling water in step S502, and a target temperature is determined when the cooling water is controlled based on the result of checking in steps S503 and S504.

Meanwhile, the second embodiment is basically the same as the first embodiment, except that the temperature of the cooling water is controlled to be rapidly increased in step S503.

Next, after the blocking of the crossover (controlling of cooling water) is completed, whether to increase the hydrogen pressure at the anode is diagnosed in step S505. When it is determined that the hydrogen pressure needs to be increased, the anode pressure is controlled to be greater than or equal to the cathode pressure, and the anode pressure is controlled to be greater than or equal to the reference pressure in step S506. On the other hand, upon determining that it is unnecessary to increase the hydrogen pressure, the hydrogen pressure is maintained at a level higher than the atmospheric pressure before supplying pure hydrogen in step S507.

Next, diagnosing whether to recirculate hydrogen before supplying hydrogen can be performed in step S508. When it is diagnosed that recirculation of hydrogen needs to be performed because the hydrogen concentration is greater than or equal to a predetermined level, hydrogen recirculation is preferably performed first, and then pure hydrogen is supplied in step S509. On the other hand, when the hydrogen concentration is lower than the predetermined level, pure hydrogen is preferably supplied immediately without recirculation, thereby securing a hydrogen concentration greater than or equal to the predetermined level in step S510.

When the recirculation and supply of hydrogen is completed, whether to recirculate air may be diagnosed in step S511. When it is diagnosed that air recirculation is needed based on the state in which the internal pressure of the cathode has dropped below atmospheric pressure, air recirculation is performed first, and then air is supplied in step S512. On the other hand, when the internal pressure of the cathode is at a level similar to atmospheric pressure, air is supplied (non-humidified state) without air recirculation control in step S513.

When the above avoidance operation processes are completed, humidification of the hydrogen supply line and the air supply line is started in step S514, and operation of the fuel cell stack is started in step S515.

Next, with reference to FIGS. 6 and 7, controlling of deterioration avoidance operation under a condition in which the fuel cell is restarted after the fuel cell system is turned off (e.g., the fuel cell is restarted after a vehicle is stopped) will be described.

Figure 6:
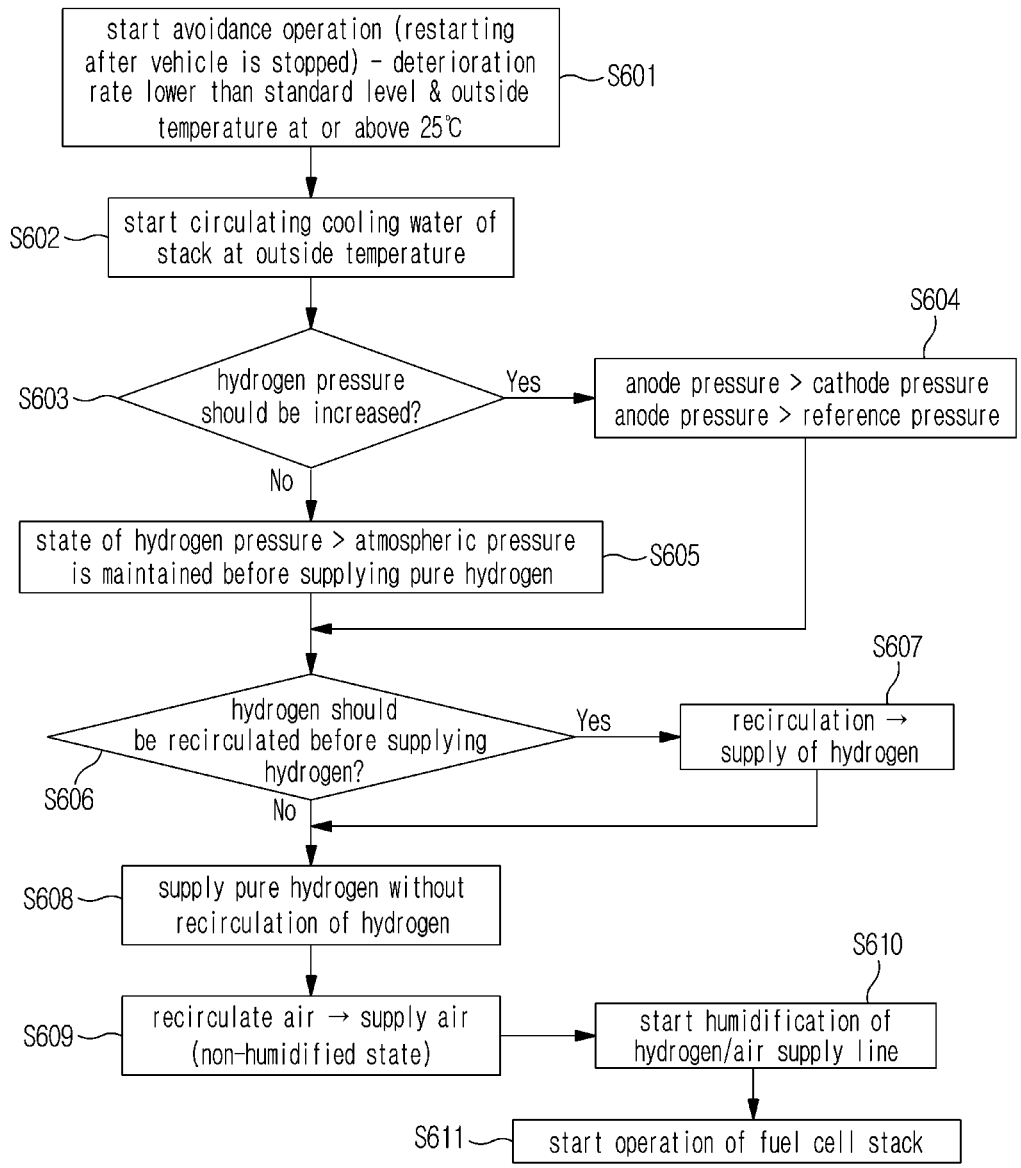
FIG. 6 is a flowchart illustrating a third embodiment of the method for controlling deterioration avoidance operation of the fuel cell system according to the present disclosure.

In this regard, FIG. 6 illustrates a third embodiment of the method for controlling deterioration avoidance operation of the fuel cell system according to embodiments of the present disclosure, wherein the deterioration avoidance operation is controlled in a state in which the deterioration rate is less than a standard level, which is good, and the outside temperature is at or above room temperature (e.g., 25° C.).

When the avoidance operation is started depending on the above-described condition in step S601, the cooling water of the fuel cell stack starts to circulate based on the condition of the outside temperature. Particularly, unlike the first embodiment, in the case of the third embodiment of FIG. 6, the entire system is stopped and then restarted so that the temperature of the fuel cell stack and the outside air temperature are almost in equilibrium, and therefore, additional control of cooling water temperature is not required. For this reason, in this embodiment, the circulation of the cooling water of the fuel cell is started at the outside temperature as in step S602.

Thereafter, increasing hydrogen pressure and recirculating hydrogen are performed in the same manner as in the first embodiment. In other words, whether to increase the hydrogen pressure at the anode is diagnosed by the controller in step S603. When it is determined that the hydrogen pressure needs to be increased, the anode pressure is controlled to be greater than or equal to the cathode pressure, and the anode pressure is controlled to be greater than or equal to the reference pressure in step S604. On the other hand, when determined that it is unnecessary to increase the hydrogen pressure, the hydrogen pressure is maintained at a level higher than the atmospheric pressure before supplying pure hydrogen in step S605.

Next, diagnosing whether to recirculate hydrogen before supplying hydrogen is performed in step S606. When it is diagnosed that recirculation of hydrogen needs to be performed because the hydrogen concentration is greater than or equal to a predetermined level, hydrogen recirculation is performed first, and then pure hydrogen is supplied in step S607. On the other hand, when the hydrogen concentration is lower than the predetermined level, pure hydrogen is supplied immediately without recirculation, thereby securing a hydrogen concentration greater than or equal to the predetermined level in step S608.

Meanwhile, in the case of the third embodiment, since the operation of the fuel cell system is completely terminated and then restarted, air recirculation is obligatory when restarting.

Therefore, unlike the first embodiment, when the hydrogen recirculation control is completed, air recirculation control may be performed obligatorily in step S609 as in FIG. 6. Therefore, air recirculation is performed first, and then air is supplied.

When the above avoidance operation processes are completed, humidification of the hydrogen supply line and the air supply line is started in step S610, and operation of the fuel cell stack is started in step S611.

Figure 7:
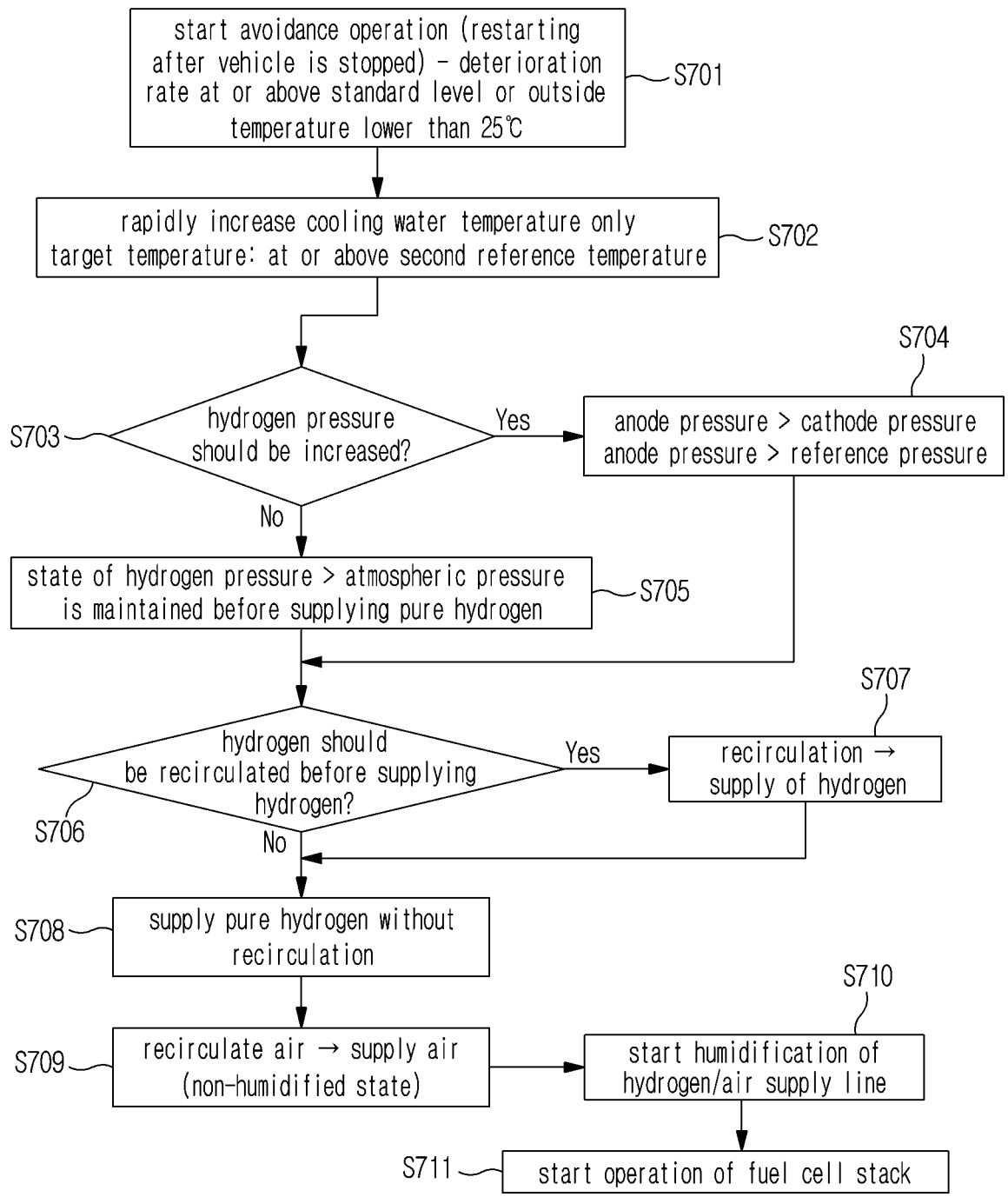
FIG. 7 is a flowchart illustrating a fourth embodiment of the method for controlling deterioration avoidance operation of the fuel cell system according to the present disclosure.

FIG. 7 illustrates a fourth embodiment of the method for controlling deterioration avoidance operation of the fuel cell system according to embodiments of the present disclosure, wherein the deterioration avoidance operation is controlled in a state in which the deterioration rate is greater than or equal to the standard level, which is bad, and the outside temperature is lower than room temperature (e.g., 25° C.), as in step S701.

Unlike the third embodiment, in the case of the fourth embodiment of FIG. 7, the degree of stack deterioration is large and the adverse effect of flooding due to condensed water in the stack during low-temperature operation is a problem, it is mandatory to perform control to rapidly increase the temperature of the cooling water during initial control. In this case, it is necessary to form a high temperature and low humidity condition. Therefore, it is considered that bidirectional crossover inside the cell should be blocked, and the cooling water temperature is immediately increased to a second reference temperature (e.g., 70° C. to 75° C.) or higher without diagnosis.

With respect to the fourth embodiment of FIG. 7, except for step S702, steps S703 to S711 are substantially the same as steps S603 to S611 in the third embodiment. Therefore, a description thereof will be omitted.

According to another embodiment of the present disclosure, when it is confirmed as an emergency state in which it is impossible to operate to avoid the mixed potential and reverse current inside the fuel cell, the system may be controlled in an emergency operation mode.

Figure 8:
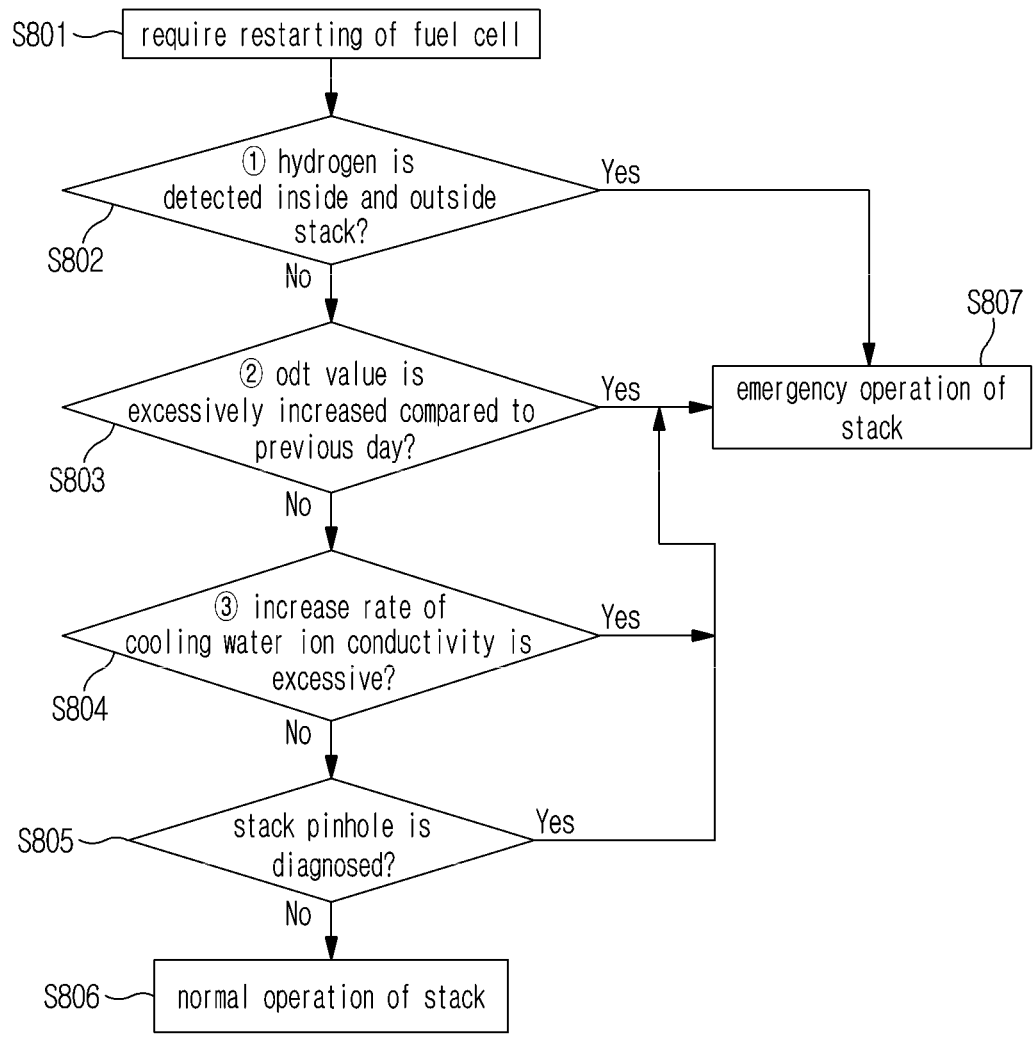
FIG. 8 is a flowchart illustrating an example in which a stack emergency operation mode is executed in the method for controlling deterioration avoidance operation of the fuel cell system according to the present disclosure.

In this regard, FIG. 8 is a flowchart illustrating an example in which a stack emergency operation mode is executed in the method of controlling deterioration avoidance operation of the fuel cell system according to embodiments of the present disclosure. The configuration configured to implement such an emergency operation mode corresponds to the emergency operation controller 56 in the controller of FIG. 2.

The emergency operation controller 56 of FIG. 2 is provided to operate the fuel cell in the emergency operation mode when it is determined that it is impossible to operate to avoid the mixed potential and reverse current inside the fuel cell.

Particularly, the emergency operation controller 56 is configured such that, when it is confirmed that a leak has occurred by diagnosing the internal and external airtightness of the fuel cell, or when membrane deterioration of the fuel cell stack is checked, it is diagnosed to be a deterioration risk state so as to perform a subsequent process in the emergency operation mode.

A diagnosis and control process performed by the emergency operation controller 56 will be described with reference to FIG. 8. A process of diagnosing whether to perform emergency operation may be executed when there is a request for restarting the fuel cell in step S801 as shown in FIG. 8. Preferably, the process may be performed as a preliminary step for determining whether to implement the avoidance operation mode in carrying out the step of starting the deterioration avoidance operation.

Particularly, the diagnosing whether to perform emergency operation may be commonly applied to all examples from the first to fourth embodiments described above. Therefore, in a case in which it is diagnosed that the emergency operation of the fuel cell stack is necessary, when the vehicle or other system is in operation, the fuel cell stop command control may be performed, and when the vehicle or other system is completely stopped, the fuel cell may be determined to be in an inoperable state, and start-up may be restricted. However, this example is only one embodiment, and a specific operation control method of the emergency operation mode may be set differently.

For example, in a case where the fuel cell system is completely stopped and then restarted, when the fuel cell is restarted after stopping the operation for more than a predetermined reference time, and before starting the deterioration avoidance operation, it may be first checked whether the deterioration avoidance operation is possible.

Here, the determining whether deterioration avoidance operation is possible means determining whether it is at a level at which deterioration avoidance operation can be performed.

According to an exemplary embodiment of the present disclosure, the process of determining whether the deterioration avoidance operation is possible may be achieved through the process of checking the internal and external airtightness of the stack and checking the membrane deterioration of the stack. Examples related to the above description are listed in FIG. 8. The internal and external airtightness of the stack may be checked by detecting hydrogen inside and outside the fuel cell stack in step S802. When it is determined that hydrogen is leaking due to a leak in an airtight portion, it is switched to a stack emergency operation in step S807. On the other hand, when there is no abnormality, the ODT information may be used to check the external airtightness of the stack once again in step S803. For example, when it is checked that the ODT value is excessively increased (e.g., 60 seconds or more) compared to the recorded ODT value during system operation at the time of the previous recording (or the previous day) in step S803, this means that the cell voltage drop rate is excessively increased compared to the previous cell voltage drop rate. In this case, a leak in an external airtight portion of the stack is suspected. Accordingly, when the increase in ODT is excessive, the stack emergency operation is performed in step S807, and when the increase in ODT is not excessive, the increase rate of the cooling water ion conductivity is checked in step S804.

When the increase rate of the cooling water ion conductivity in the stack is at or above a predetermined level, for example, the increase rate is doubled compared to the value recorded during system operation at the time of the previous recording (or the previous day), a leak in internal airtightness of the stack or deterioration of cell due to contamination may be suspected. Therefore, based on the result of checking the increase rate of the cooling water ion conductivity in the stack, the internal airtightness of the stack is checked in step S804, and when there is a problem, the stack emergency operation is performed in step S807. When there is no abnormality as a result of diagnosing the increase rate of the cooling water ion conductivity, stack pinhole failure may be diagnosed in step S805. In this step, based on the ODT value of the cell having the lowest ODT when the stack operation is stopped, when the lowest ODT value is less than the minimum decay time (e.g., 20 seconds), it is determined that the deterioration avoidance operation is impossible, and the stack emergency operation is executed in step S807. In step S805, membrane deterioration of the stack is detected by checking the anode hydrogen consumption rate when the stack operation is stopped. When it is determined that there is no abnormality, the next step, which is the normal stack operation, is performed, as in step S806. Preferably, during normal stack operation, the avoidance operation control may be performed based on the first to fourth embodiments related to the above-described avoidance operation control based on a condition related to the current state.

As is apparent from the above description, embodiments of the present disclosure provide a method and a device for controlling deterioration avoidance operation of a fuel cell system, which may be capable of increasing the durability of the fuel cell by preventing deterioration of the fuel cell by diagnosing the risk of generation of mixed potential and reverse current in the fuel cell at an early stage and starting the deterioration avoidance operation in advance to prevent deterioration.

In embodiments of the present disclosure, it may be possible to prevent deterioration due to generation of mixed potential and reverse current in the fuel cell even when only a battery operates in the fuel cell system, such as in the EV mode, and the fuel cell operation is temporarily stopped, as well as when the stack is restarted. Therefore, effective deterioration prevention may be achieved in a wider operation condition.

According to embodiments of the present disclosure, when gas is mixed at the electrodes due to excessive inflow of anode air or cathode hydrogen under various conditions, such as stack operation or start/stop of the fuel cell system, it may be possible to prevent local cell degradation due to generation of a local reverse current and a mixed potential due to the mixing of gas. Accordingly, the durability of the fuel cell system may be remarkably improved.

According to embodiments of the present disclosure, when performing an operation to avoid deterioration due to generation of mixed potential and reverse current in the fuel cell, it may be possible to control the system based on the optimal avoidance strategy derived in advance in consideration of the state of the fuel cell and the surroundings thereof. Accordingly, it may be possible to selectively apply the avoidance operation control suitable for the situation in real time based on the result of the deterioration risk diagnosis, thereby increasing operation stability and durability of the fuel cell system under optimal operation conditions.

Although the preferred embodiments of the present disclosure have been disclosed for illustrative purposes, those skilled in the art will appreciate that various modifications, additions and substitutions are possible, without departing from the scope and spirit of the invention as disclosed in the accompanying claims.

What is claimed is:

1. A method of controlling deterioration avoidance operation of a fuel cell system comprising an energy storage device, the method comprising:
   starting the deterioration avoidance operation when an operation of the fuel cell is restarted in a state where the energy storage device is operating, and the fuel cell is stopped;
   controlling hydrogen pressure at an anode based on a predetermined condition, the condition indicating that the hydrogen pressure at the anode needs to be increased;
   determining hydrogen recirculation and supplying hydrogen, comprising a process performed such that whether to recirculate hydrogen is determined based on a predetermined condition, the condition indicating that hydrogen needs to be recirculated, before supplying hydrogen;
   determining air recirculation and supplying air, comprising a process performed such that whether to recirculate air is determined based on a predetermined condition, the condition indicating that air needs to be recirculated, before supplying air; and
   terminating the deterioration avoidance operation and starting an operation of the fuel cell.

2. The method according to claim 1, wherein the starting the deterioration avoidance operation comprises controlling cooling water setting performed such that a temperature of cooling water in the fuel cell is variably controlled based on a deterioration rate of the fuel cell and outside temperature.

3. The method according to claim 2, wherein the controlling cooling water setting is performed such that, in a case where the deterioration rate of the fuel cell is lower than a standard level and the outside temperature is at or above a reference temperature, the temperature of the cooling water is controlled so that a target temperature of the fuel cell is maintained lower than a first reference temperature only when an open circuit voltage (OCV) is lower than a first set voltage, and in a case where the deterioration rate of the fuel cell is greater than or equal to the standard level and the outside temperature is lower than the reference temperature, the temperature of the cooling water is controlled to be increased by a heater so that the target temperature of the fuel cell is greater than or equal to a second reference temperature only when the open circuit voltage (OCV) is lower than the first set voltage.

4. The method according to claim 1, wherein the controlling hydrogen pressure is performed such that whether to increase hydrogen pressure at the anode is diagnosed based on open circuit decay time (ODT), and the hydrogen pressure at the anode is increased to exceed a predetermined anode reference pressure based on the diagnosis result so as to selectively control the anode pressure to be maintained greater than the cathode pressure.

5. The method according to claim 1, wherein the determining hydrogen recirculation and supplying hydrogen is performed such that whether to recirculate hydrogen is diagnosed based on an open circuit voltage (OCV) and deviation of current distribution within the fuel cell so as to selectively recirculate hydrogen based on the diagnosis result, and then pure hydrogen is supplied.

6. The method according to claim 1, wherein the determining air recirculation and supplying air is performed such that whether to recirculate the air is diagnosed based on deviation of open circuit voltage (OCV) between cells while the fuel cell operation is stopped so as to selectively recirculate the air based on the diagnosis result, and then air is supplied.

7. A method of controlling deterioration avoidance operation of a fuel cell system, the method comprising:
   starting the deterioration avoidance operation when the fuel cell is restarted after the fuel cell system is turned off;
   controlling hydrogen pressure at an anode based on a predetermined condition, the condition indicating that the hydrogen pressure at the anode needs to be increased;
   determining hydrogen recirculation and supplying hydrogen comprising a process performed such that whether to recirculate hydrogen is determined based on a predetermined condition, the condition indicating that hydrogen needs to be recirculated, before supplying hydrogen;
   recirculating air and supplying air performed such that air is recirculated, and then air is supplied to a cathode; and
   terminating the deterioration avoidance operation and starting an operation of the fuel cell.

8. The method according to claim 7, wherein the starting the deterioration avoidance operation is performed such that, in a case where the deterioration rate of the fuel cell is lower than a standard level and the outside temperature is at or above a reference temperature, cooling water is recirculated based on the outside temperature, and in a case where the deterioration rate of the fuel cell is greater than or equal to the standard level and the outside temperature is lower than the reference temperature, the temperature of the cooling water is controlled to be increased by a heater so that the target temperature of the fuel cell is greater than or equal to a second reference temperature.

9. The method according to claim 7, wherein the controlling hydrogen pressure is performed such that whether to increase the hydrogen pressure at the anode is diagnosed based on open circuit decay time (ODT), and the hydrogen pressure at the anode is increased to exceed a predetermined anode reference pressure based on the diagnosis result so as to selectively control the anode pressure to be maintained greater than the cathode pressure.

10. The method according to claim 7, wherein the determining hydrogen recirculation and supplying hydrogen is performed such that whether to recirculate hydrogen is diagnosed based on the open circuit voltage (OCV) and the deviation of current distribution inside the fuel cell so as to selectively recirculate hydrogen based on the diagnosis result, and then pure hydrogen is supplied.

11. The method according to claim 7, wherein the starting the deterioration avoidance operation is performed such that when the fuel cell starts operating after being stopped for more than a preset reference time, whether the deterioration avoidance operation is possible is checked before starting the deterioration avoidance operation, and when any one among a detected amount of hydrogen outside the fuel cell, an increase in open circuit decay time (ODT), and an increase rate of cooling water ion conductivity compared to previous measurements exceeds a preset criteria for a corresponding one thereof, or when a minimum value of ODT for each cell is less than a minimum decay time while the fuel cell operation is stopped, it is determined that the deterioration avoidance operation is impossible, and the fuel cell is switched to a state in which starting of the fuel cell is impossible.

12. An operation control device configured to avoid deterioration of a fuel cell when the fuel cell is restarted after being stopped, the device comprising:
a state information collector configured to collect state information of fuel cell system comprising a voltage, a current, and an ODT of the fuel cell;
a cooling water controller configured to control a temperature and circulation of the cooling water;
a hydrogen pressure controller configured to selectively increase anode hydrogen pressure depending on an anode hydrogen pressure increase condition, the condition being determined based on the ODT information provided from the state information collector;
a hydrogen recirculation controller configured to selectively perform hydrogen recirculation before supplying hydrogen depending on the hydrogen recirculation condition determined based on the open circuit voltage information and the deviation of current distribution inside the fuel cell provided from the state information collector; and
an air recirculation controller configured to selectively perform air recirculation before supplying air depending on the air recirculation condition determined based on the open circuit voltage information or stoppage condition before restart provided from the state information collector.

13. The device according to claim 12, wherein the state information collector is configured to further collect degradation degree and outside temperature of the fuel cell, and
wherein the cooling water controller is configured such that:
when restarting the fuel cell after temporarily stopping the operation of the fuel cell while an energy storage device is operating, in a case where the deterioration rate of the fuel cell is lower than a standard level and the outside temperature is at or above a reference temperature, the temperature of the cooling water is controlled so that a target temperature of the fuel cell is maintained lower than a first reference temperature only when an open circuit voltage (OCV) is lower than a first set voltage, and in a case where the deterioration rate of the fuel cell is greater than or equal to the standard level and the outside temperature is lower than the reference temperature, the temperature of the cooling water is controlled to be increased by a heater so that the target temperature of the fuel cell is greater than or equal to a second reference temperature only when the open circuit voltage (OCV) is lower than the first set voltage; and
when the fuel cell is restarted after the fuel cell system is turned off, in a case where the deterioration rate of the fuel cell is lower than a standard level and the outside temperature is at or above a reference temperature, cooling water is recirculated based on the outside temperature, and in a case where the deterioration rate of the fuel cell is greater than or equal to the standard level and the outside temperature is lower than the reference temperature, the temperature of the cooling water is controlled to be increased by a heater so that the target temperature of the fuel cell is greater than or equal to a second reference temperature.

14. The device according to claim 12, wherein the air recirculation controller is configured such that:
when an operation of the fuel cell is restarted in a state where the energy storage device is operating, and the fuel cell is stopped, air recirculation is performed before supplying air only when the deviation of the open circuit voltage (OCV) between cells exceeds a preset reference value during operation of the fuel cell; and
when the fuel cell is restarted after the fuel cell system is turned off, air recirculation is obligatorily performed before supplying air.

* * * * *